US010628858B2

(12) United States Patent
Garcia-Martinez et al.

(10) Patent No.: US 10,628,858 B2
(45) Date of Patent: Apr. 21, 2020

(54) INITIATING REAL-TIME BIDDING BASED ON EXPECTED REVENUE FROM BIDS

(71) Applicant: Facebook, Inc., Menlo Park, CA (US)

(72) Inventors: Antonio Felipe Garcia-Martinez, Alameda, CA (US); Mark Rabkin, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 288 days.

(21) Appl. No.: 13/764,750

(22) Filed: Feb. 11, 2013

(65) Prior Publication Data
US 2014/0229273 A1 Aug. 14, 2014

(51) Int. Cl.
*G06Q 30/02* (2012.01)

(52) U.S. Cl.
CPC ............................. *G06Q 30/0275* (2013.01)

(58) Field of Classification Search
USPC .............................................. 705/14.1–14.73
See application file for complete search history.

(56) References Cited

U.S. PATENT DOCUMENTS

| | | | |
|---|---|---|---|
| 6,907,566 B1* | 6/2005 | McElfresh | G06Q 30/02 715/210 |
| 2005/0080708 A1* | 4/2005 | Zhang et al. | 705/37 |
| 2008/0010144 A1 | 1/2008 | Chatwin et al. | |
| 2009/0083098 A1 | 3/2009 | Schwarz | |
| 2009/0132340 A1* | 5/2009 | Demir et al. | 705/10 |
| 2009/0164298 A1 | 6/2009 | Gluhovsky et al. | |
| 2010/0114716 A1 | 5/2010 | Heilig et al. | |
| 2010/0241511 A1* | 9/2010 | Cunningham | G06Q 30/02 705/14.46 |
| 2011/0231240 A1 | 9/2011 | Schoen et al. | |
| 2011/0314114 A1 | 12/2011 | Young et al. | |
| 2012/0158522 A1 | 6/2012 | Nazer Zadeh et al. | |
| 2013/0124628 A1 | 5/2013 | Weerasinghe | |
| 2013/0238745 A1 | 9/2013 | Ramachandran et al. | |
| 2013/0291123 A1 | 10/2013 | Rajkumar et al. | |
| 2013/0305280 A1 | 11/2013 | Fleischman | |

(Continued)

FOREIGN PATENT DOCUMENTS

| | | |
|---|---|---|
| JP | 2001-283049 A | 10/2001 |
| JP | 2007-122592 A | 5/2007 |
| JP | 2012-503246 A | 2/2012 |

(Continued)

OTHER PUBLICATIONS

Mayer et al., "Third-Party Web Tracking: Policy and Technology" (published in 2012 IEEE Symposium on Security and Privacy, pp. 413-427, May 1, 2012) (Year: 2012).*

(Continued)

*Primary Examiner* — James M Detweiler
*Assistant Examiner* — Patrick Kim
(74) *Attorney, Agent, or Firm* — Fenwick & West LLP

(57) ABSTRACT

An online system provides advertisers with opportunities to bid on presentation of advertisements to a user. Advertisers may bid in real-time on advertisement presentation if the online system determines the expected revenue to the online system from real-time bids is above a threshold value. The expected revenue may be determined based on a probability distribution bids previously placed by advertisers for presenting advertisements to the user or to users with similar characteristics as the user.

12 Claims, 9 Drawing Sheets

(56) References Cited

U.S. PATENT DOCUMENTS

2014/0046777 A1    2/2014  Markey et al.
2014/0257999 A1    9/2014  Garcia-Martinez

FOREIGN PATENT DOCUMENTS

JP          2013-502018 A      1/2013
KR          10-0849041 B1      7/2008
WO          WO 2011/035156 A2  3/2011
WO          WO 2011/111167 A1  9/2011

OTHER PUBLICATIONS

PCT International Search Report and Opinion, PCT Application No. PCT/US2014/011947, dated May 14, 2014, twelve pages.
Japan Patent Office, Notification of Reasons for Rejection, JP Patent Application No. 2015-556951, dated Feb. 6, 2018, ten pages.

\* cited by examiner

Match Table 400

|     | User ID | Browser ID | Partner ID |
|-----|---------|------------|------------|
| 402 | Sebastian | B_987 | ABC |
| 404 | -logged out- | B_654 | ZYQ |
| 406 | Viola | B_987 | ABC |
| 408 | Viola | B_123 | TSV |
| 410 | Olivia | B_654 | ZYQ |

INITIATING REAL-TIME BIDDING BASED ON EXPECTED REVENUE FROM BIDS

BACKGROUND

This invention relates generally to advertising, and in particular to real-time bidding for advertising impressions in social networking and other online systems.

Advertisers pay various online systems to present their advertisements ("ads") to users of the online systems. The advertisers often seek to present ads to users likely to be interested in their products or services and most likely to purchase the advertised products or services. Accordingly, if a user of an online system is more likely to purchase an advertised product or service, an advertiser may increase the amount paid to the online system to present the ads to that user.

To identify users likely to interact with an advertisement or likely to purchase advertised products or services, advertisers or advertising partners often store online browsing activity of users. Based on users' browsing activity, the advertiser or advertising partner may increase the amount offered to an online system to present advertisements to users that visited certain websites or purchased certain items. However, advertisers typically index stored browsing activity based on the browser used to perform the browsing. Because users may use multiple browsers for online browsing, and multiple users may use the same browser, advertisers may incorrectly target their advertisements if they rely on browser-indexed history to identify potentially-interested users.

SUMMARY

A social networking system allows advertisers or advertising partners to bid on presentation of advertisements to a user. These bids may be received in real time, as a user accesses services of the social networking system and while there exists an opportunity to present an advertisement to the user. This allows advertisers to select a particular advertisement to present to the user when the user is accessing content. In one embodiment, the social networking system retrieves bids previously received from advertisers for presenting an advertisement to the user or to users with similar characteristics as the user. Based on the previously received bids, the social networking system generates a probability distribution describing a likelihood of receiving bids having various bid values. From the probability distribution, the social networking system determines an expected revenue to receiving additional bids from advertisers, such as bids received in real-time. If the expected revenue is greater than a threshold value, the social networking system requests additional bids from the advertiser, which identifies an advertisement and a bid value, and selects an advertisement from the additional bids. In one embodiment, the threshold value is a clearing price from selecting an advertisement based on previously stored bid values, so additional bids are received when they are likely to increase the revenue to the social networking system but not when they are unlikely to increase social networking system revenue.

The features and advantages described in this summary and the following detailed description are not all-inclusive. Many additional features and advantages will be apparent to one of ordinary skill in the art in view of the drawings, specification, and claims. For example, although embodiments of the invention are discussed with reference to a social networking system, embodiments of the invention may be used with other online systems that can match a user's identity across multiple devices and/or browsers may be used.

BRIEF DESCRIPTION OF THE DRAWINGS

FIG. 4 illustrates an example identification match table, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
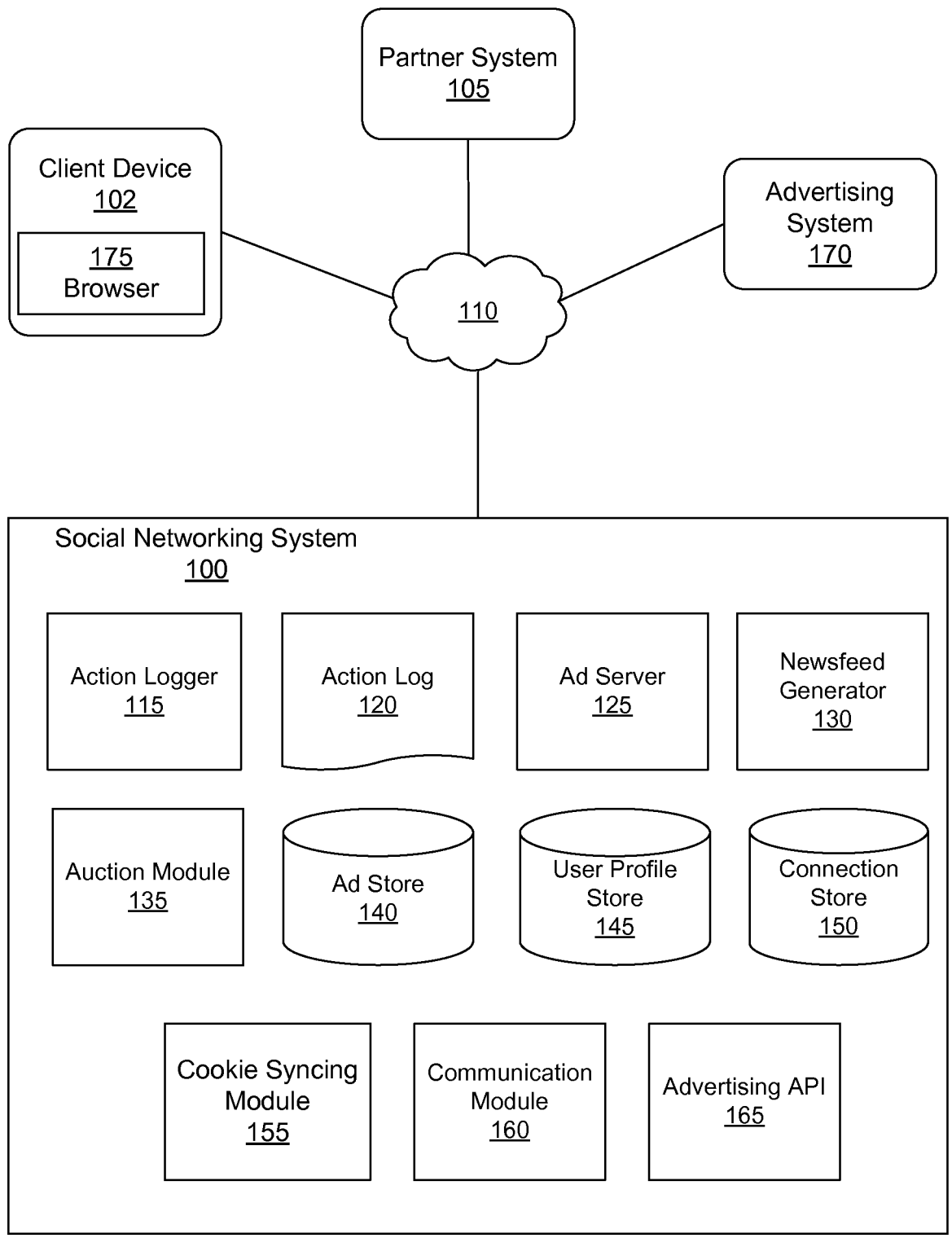
FIG. 1 is a block diagram of a social networking system, according to one embodiment.

FIG. 1 is a block diagram of one embodiment of a system architecture of a social networking system 100. The system architecture may be configured as computer-executable program modules. As used herein, the term "module" refers to computer program logic and/or data for providing specified functionality. A module may be implemented in hardware, firmware, and/or software. The social networking system 100 includes an action logger 115, an action log 120, an advertisement ("ad") server 125, a newsfeed generator 130, an auction module 135, an ad store 140, a user profile store 145, a connection store 150, a cookie syncing module 155, a communication module 160, and an advertising application programming interface (API) 165. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The social networking system 100 offers its users the ability to communicate and interact with other users. In use, users join the social networking system 100 and then add connections to a number of other users to whom they desire to be connected. As used herein, the term "friend" refers to any other user to which a user has formed a connection, association, or relationship via the social networking system 100. Connections may be added explicitly by a user (e.g., a user selecting another to be a friend), or may be created by the social networking system 100 based on common characteristics of the users (e.g., users who are alumni of the same educational institution).

Connections in social networking system are usually bidirectional, but need not be, so the terms "user" and "friend" depend on the frame of reference. For example, if Bob and Joe are both users and connected to each other in the social networking system 100, Bob and Joe, both users, are also each other's friends. A connection between users may be a direct connection; however, in some embodiments, a connection between users may be indirect via one or more levels of connections. Also, the term "friend" need not require that users actually be friends in real life (which would generally be the case when one of the users is a business or other entity), but is used herein to indicate a connection in the social networking system 100.

The social networking system 100 allows its users to take actions on various types of items maintained by the social networking system 100. These items may include groups or networks (where "networks" here refer not to physical communication networks, but rather to social networks of people) to which users of the social networking system 100 may belong, events or calendar entries in which a user might be interested, computer-based applications that a user may use via the social networking system 100, and transactions that allow users to buy, sell, auction, rent, or exchange items via the social networking system 100. These are merely examples of the items upon which a user may act on a social networking system 100, and many others are possible.

A client device 102 interacts with the social networking system 100 through the network 110, which is a communication pathway between the client device 102, a partner system 105, an advertising system 170, and/or the social networking system 100. The network 110 is typically the Internet, but may be any communication pathway, such as a local area network (LAN), a metropolitan area network (MAN), a wide area network (WAN), a mobile wired or wireless network, a private network, or a virtual private network. In one embodiment, the network 110 uses standard communications technologies and/or protocols. Examples of protocols used on the network 110 can include the transmission control protocol/Internet protocol (TCP/IP), the hypertext transport protocol (HTTP), the file transfer protocol (FTP), etc. Data exchanged over the network 110 can be represented using technologies and/or formats including the hypertext markup language (HTML), the extensible markup language (XML), etc. In some embodiments, the entities can use custom and/or dedicated data communications technologies instead of, or in addition to, the ones described above.

The client device 102 may be a desktop computer, laptop computer, portable computer, personal digital assistant (PDA), smart phone, or any other device including computing functionality and data communication capabilities. A plurality of client devices 102 can be configured to communicate via the network 110. Although FIG. 1 shows a single client device 102 for simplicity, many client devices 102 may interact with social networking system 100.

In one embodiment, the client device 102 executes one or more browsers 175, which may be used by users to access the social networking system 100. In one embodiment, a user logs into an account on the social networking system 100 to access a personalized set of web pages, such as a user profile page and a newsfeed page, using a browser 175. When a user logs in to its account with the social networking system 100, the social networking system 100 writes one or more cookies to the client device 102, such as to the browser 175, identifying the user and the browser. For example, a cookie including a user identifier associated with the user by the social networking system 100 is stored and a cookie including a browser identifier is stored; the cookie including the browser identifier may include data identifying a browser type. While the user is logged in to the social networking system 100 using the browser 175, the cookie including the user identifier is stored by the browser 175. The cookie including the browser identifier is stored until it is deleted by the user or until the browser 175 deletes all its cookies. In one embodiment, users may opt out of receiving cookies from the social networking system 100, so the social networking system 100 does not write cookies on the browser 175.

The action logger 120 identifies interactions of users internal to the social networking system 100 and performed on other systems, and logs the information in the action log 115. User interactions internal to the social networking system 100 include interactions between users, interactions between a user and a page within the social networking system 100, interactions between a user and a post on a page, and user visits to or interactions with a page outside the social networking system 100 including plug-ins for communicating data to the social networking system 100. Examples of user actions external to the social networking system 100 include purchasing or reviewing a product or service using an online marketplace hosted by a third-party website, registering with or subscribing to a website hosted by a third-party application server, requesting information from a third-party website, and other similar actions. When an action is taken on and/or off the social networking system, an entry for the action is generated by the action logger 120 and stored in the action log 115.

After an amount of time, the action log 115 is populated with a number of entries describing actions taken by social networking system users. Thus, the action log 115 includes a rich set of data describing user actions, and can be analyzed and filtered to identify trends and relationships in the user actions, as well as affinities between the users and various objects.

The social networking system 100 maintains a user profile for each user. Any action taken by a user and identified by the action logger 120 is associated with the user's user profile. Examples of actions include: establishing connections with other users, viewing content associated with other users, joining a group, attending an event, adding an application, or completing a transaction with another user. The user profile store 145 stores user profiles describing social networking system users. Examples of information included in a user profile include biographic information, demographic information, and other types of descriptive information, such as work experience, educational history, hobbies or preferences, location, and the like. When a user manually enters information to a corresponding user profile, such as name, location, sex, age, and date of birth, the information is stored in the user profile store 145. In one embodiment, the user profile store 145 also stores login or authentication information for a user that is referenced when a user attempts to log in to the social networking system 100.

Communication module 160 provides various methods for users to communicate, including but not limited to posting on pages associated with users or entities, presenting news feeds, sending emails, or providing customized user interfaces such as side bars or fly-outs. The connection store 150 stores information describing connections between users or between users and objects. For example, the connection store 150 associates a list of users connected to a user and may include information describing types of interactions between the user and users connected to the user. Additional information may also be maintained in the connection store, such as affinities between the user and other users connected to the user. Communications between a user and other users connected to the user may be stored in the connection store 150. Hence, for a user, information associated with the user and stored in the action log 115, the user profile store 145, and the connection store 150 may be used to predict characteristics of the user.

The newsfeed generator 130 generates communications for each user about information that may be relevant to the user. These communications may be stories, where a story is an information message comprising data describing an action in the action log 115 that is relevant to the particular user. These stories are presented to a user via one or more pages of a website of the social networking system 100, for example in each user's profile page or newsfeed page. Alternatively, the stories may be presented to the user via any suitable communication method, such as notification messages, email, text messages, presentation on a social-plug in included in a web page external to the social networking system 100, or any other method.

The advertising system 170 interacts with the social networking system 100 through the network 110. Although a single advertiser system 170 is illustrated in FIG. 1, many advertiser systems 170 may interact with the social networking system 100. Advertisers create and manage advertisements that may be presented through the social networking system 100 using the advertising system 170. In one embodiment, advertisers also use the advertising application program interface (API) 165 of the social networking system 100 to create advertisements. For example, an advertiser uses the advertising system 170, interacting with the advertising API 165, to send an ad request to the social networking system 100. The ad request describes characteristics of an advertisement, such as content for presentation to users, a bid amount, a budget, targeting criteria for identifying users eligible to view the content, or other information. The advertising API 165 formats the advertisements described by the ad requests and stores them in the ad store 140.

Figure 2:
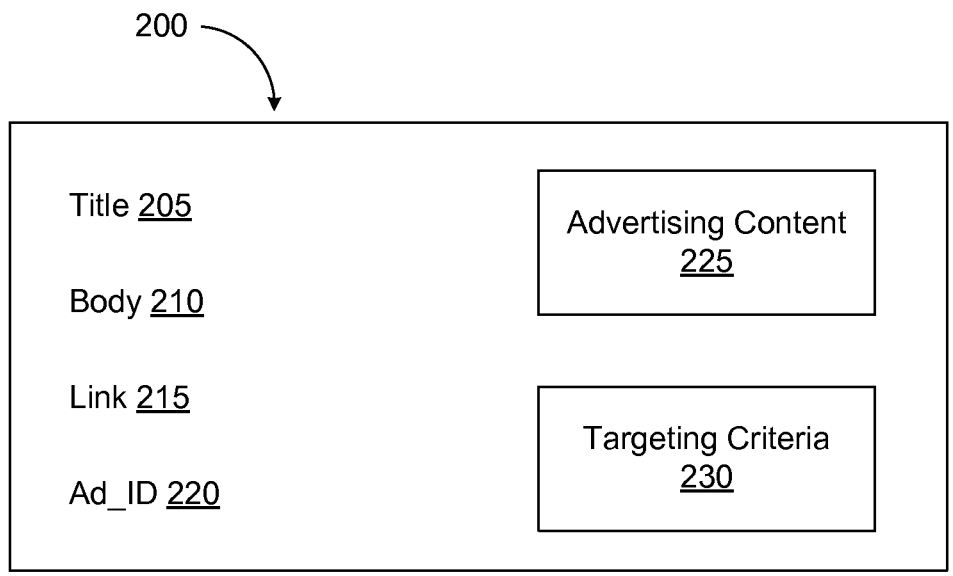
FIG. 2 illustrates an example ad request, according to one embodiment.

An example ad request 200 generated by an advertising system 170 is illustrated in FIG. 2. The example ad request 200 comprises a title field 205, a body field 210, a link field 215, and an ad identifier field 220. The title field 205 and body field 210 may be used by the social networking system 100 to publish the advertisement in a story format, in a side panel, or in any other suitable format. The published ad may include the content of the title field 205 as a header of the ad and the content of the body field 210 as a textual story. For example, the content of the body field 210 may specify: "Marc-Andre Hamelin: Performing Paul Dukas' stunning Piano Sonata in E-flat minor at a Concert Hall Near You! Buy Tickets Today!" The link field 215 may include a link to a website from which a user may purchase tickets to the concert. The resulting ad presents the text in the body field 210 and the link in the link field 215. The ad identifier field 220 specifies information identifying the advertisement, allowing the advertising system 170 and the social networking system 100 have a common identifier associated with each ad request 200.

The ad request 200 may also include additional advertising content 225 to be appended to the ad. This content 225 may include any type of media content suitable for presentation on a web page, including pictures, video, audio, hyperlinks, or any other suitable content. The ad request 200 may also include targeting criteria 230 that specifies characteristics of users to which the ad is eligible to be presented. Targeting criteria 230 allow advertisers to identify social networking system users are most likely to purchase a product or service from the advertiser. An example of targeting criteria specifies users between the ages of 18 and 30 having early $20^{th}$ century music in their interests. Targeting criteria 230 may alternatively specify actions of a user within the social networking system 100 or on websites external to the social networking system 100. For example, targeting criteria may specify a keyword for which the user has searched. In one embodiment, targeting criteria 230 are a filter applied to fields of user profiles or other objects, and/or it may include free form text.

In one embodiment, the ad request 200 specifies a bid value indicating the amount of money that an advertiser will pay the social networking system 100 for each time the ad corresponding to the ad request 200 is displayed to a user (cost per impression, or CPM) or each time a user clicks on the ad (cost per click, or CPC). The bid value may be related to the targeting criteria 230. For example, the advertiser may specify a high bid value associated with users matching all targeting criteria, a slightly lower bid value for users matching most of the targeting criteria, etc. Alternatively or additionally, bid values may be specified in "real time," or at substantially the same time, as an advertisement is presented to a user, enabling the advertiser or a partner of the advertiser to select different bid values for different users.

Returning to FIG. 1, the partner system 105 also interacts with social networking system 100 and advertising system 170 through the network 110. In one embodiment, the partner system 105 is a demand-side platform (DSP) bidding on and purchasing advertising impressions (i.e., presentation of advertisements) for an advertiser. For example, an advertiser may interact with the partner system 105 using the advertising system 170 to specify advertising constraints, such as targeting criteria and maximum budget. An advertiser using the advertising system 170 may also provide the partner system 105 with advertisements or ad identifiers of advertisements stored by the social networking system 100. Using the advertising constraints, the partner system 105 bids on presentation of the ads of the advertiser to users of the social networking system 100 or to users of other online systems. Although a single partner system 105 is illustrated in FIG. 1, a plurality of partner systems 105 may interact with the social networking system 100 to bid on advertising impressions. Each partner system 105 may bid on behalf of many advertisers.

In one embodiment, partner systems 105 determine whether users satisfy targeting criteria associated with ad requests by monitoring Internet browsing behaviors of the users. For example, a partner system 105 bids on presenting an advertisement to a user of the social networking system 100 based on the user's behavior on other websites, including web pages visited, keywords searched, items purchased, etc. A user may opt out of tracking, preventing the partner system 105 from monitoring the user. In one embodiment, the partner system 105 uses a web bug or a tracking pixel placed on third-party websites to monitor users visiting the websites that have not opted out of tracking. The tracking pixel is a segment of HTML code that the partner system 105 adds to third-party websites. For example, the tracking pixel may be a transparent 1×1 image, an iframe, or other suitable object. When a user's browser 175 requests the content of a page having the tracking pixel, the content of the pixel is also requested from the partner system 105. The request for the content of the pixel includes information about the client device 102 and the browser 175, such as the Internet Protocol (IP) address of the client device 105 and cookies the partner system 105 has set in the browser 175. In one embodiment, a cookie set by the partner system 105 includes an identification of the browser 175 by the partner system 105, which is referred to herein as a "partner identifier."

For example, a user may search for flights to Vienna, Austria on a travel website partnered with the partner system 105. A tracking pixel included on the travel website by the partner system 105 informs the partner system 105 of the search. If the browser 175 used to visit the website does not include a cookie previously set by the partner system 105, the partner system 105 sets a cookie on the browser 175 and logs a partner identifier of the browser and the search information. If the browser 175 includes a cookie associated with the partner system 105, the partner system 105 retrieves the partner identifier of the browser from the cookie and adds the search for flights to Vienna to previously-stored information associated with the retrieved partner identifier describing activity of the browser 175.

The partner system 105 may maintain a log of a browsing activity associated with partner identifiers, including visiting web pages, searching for information or products, and purchasing products. When opportunities arise to present advertisements using a browser 175 associated with a partner identifier, the partner system 105 bids on one or more of the impression opportunities to provide an advertiser's ads to the browser 175. For example, a website may allocate space for presentation of three advertisements along with website content. The website may request ads to fill the three spaces from the partner system 105, so the partner system 105 submits bids identifying one or more advertisements for one or more of the three spaces. The bids may be based on the online activity associated with a partner identifier corresponding to the browser 175 and any advertisement targeting criteria. For example, an airline may work with the partner system 105 to advertise flights offered by the airline to various destinations in Europe. If a user has recently (e.g., in the last day) searched for flights to Vienna, the partner system 105 may bid on an advertising opportunity using the browser 175 used to search for flights based on the prior search for flights to Vienna using the browser 175.

The bids placed by the partner system 105 specify a value that the partner system 105 (or the advertiser represented by the partner system 105) will pay the social networking system 100 to present the advertisement. In one embodiment, the bid value is based on a degree of similarity between interests of a user and targeting criteria of an ad. For example, an airline may specify targeting criteria for advertisements for flights to Europe that specify an age range (e.g., 21- to 35-years old) and recent interactions associated with flights to a particular European destination. Hence, the partner system 105 may place a bid with a large value for presenting advertisements for flights to Vienna to a 25-year-old user that has recently searched for flights to Vienna, while placing a bid with a smaller value for presenting the same user with advertisements for flights to Berlin.

The cookie syncing module 155 matches cookies identifying a social networking system user and a browser used by the user to access the social networking system 100. In one embodiment, the cookie syncing module 155 associates a user identifier of the social networking system and a browser identifier. Additionally, the cookie syncing module 155 associates a partner identifier with an association between a user identifier and a browser identifier. For example, a partner identifier is associated with a pairing of user identifier and browser identifier, allowing a partner system 105 to identify a social networking system user from a partner identifier. The cookie syncing module 155 is described in further detail below.

The auction module 135 manages auctions for presenting advertisements and selects advertisements for presentation to a user based on bid values associated with advertisements. In one embodiment, the auction module 135 selects an ad for presentation based on bid values associated with a plurality of candidate ad requests. The auction module 135 determines a set of candidate ads by filtering the ads in the ad store 140 based on the targeting criteria 230 associated with the stored ads, the information in action log 115, user profile store 145, and connection store 150 for a user. If the bid value of an ad is a cost per impression price, the candidate ad having the highest bid value is selected as the winner of the auction. Alternatively, if the bid value of an ad is a cost per click price, the auction module 135 determines an expected value for each candidate ad and selects the candidate ad having the highest expected value. The expected value of a candidate ad may be a function of a per-click bid price for an ad weighted by an estimated probability that the ad will be accessed by the user.

In another embodiment, the auction module 135 receives bids from partner systems 105 for presenting advertisements to a user when the user accesses the social networking system 100. Each bid specifies a bid value and an advertisement in the ad store 140 (e.g., an ad identifier 220) for presentation to a user. For example, a web page operated by the social networking system 100 has space for one advertisement. Between the user's browser 175 requesting the web page from the social networking system 100 and the social networking system 100 providing the web page, the auction module 135 requests bids from partner systems 105 for an advertisement to be presented in the space. The request may identify the user requesting the web page. For example, the request includes a partner identifier determined form the cookie syncing module 155 based on the user identifier and browser identifier. The partner systems 105 select advertisements to present to the target user based on the request and provide the auction module 135 with bid values for each selected advertisement. The auction module 135 identifies a winning bid from the set of real-time bids received from the partner systems 105. Additional functions of the auction module 135 are described in further detail below.

The ad server 125 exchanges data with the auction module 135, the user profile store 145, and the ad store 140. The ad server 125 receives one or more ad identifiers from the auction module 135 specifying one or more ads in the ad store 140 to be presented to a user. In one embodiment, the ad server 125 presents advertisements to users through the social networking system 100, for example as a story in a user's newsfeed. The ad server 125 may additionally or alternatively send advertisements to external applications that have access to a user's identification on the social networking system 100 for presentation. For example, a user may log in to the social networking system 100 through a mobile application on a smart phone. The mobile application may request advertisements from the social networking system 100, which are provided to the mobile application by the ad server 125.

Cookie Syncing

If a user has not opted out of receiving cookies from the social networking system 100, a browser 175 executing on the client device 102 used to access the social networking system 100 may have one or more cookies set by the social networking system 100. In one embodiment, the social networking system 100 sets a user identification cookie on a user's browser 175 when the user logs in to the system 100. The user identification cookie includes a user identifier associated with the user accessing the social networking system 100. Until the user logs out of the social networking system or deletes cookies on the browser 175, the social networking system 100 may obtain the user identifier from the user identification cookie.

In one embodiment, the social networking system 100 also sets a browser identification cookie on the browser 175. The browser identification cookie includes a browser identifier associated with the browser 175 by the social networking system 100. Until the browser identification cookie is deleted by a user or by the browser 175, the social networking system 100 retrieves the browser identifier from the browser identification.

The cookie syncing module 155 identifies and associates user identifiers with browser identifiers. The associations identify known combinations of users and browsers 175 that have accessed the social networking system 100 and that have allowed cookies. For example, a user may access an account on the social networking system 100 from multiple browsers executing on the same or different client devices 102. Accordingly, the cookie syncing module 155 stores multiple associations between the user's user identifier and different browser identifiers associated with each of the browsers 175 used to access the social networking system 100. Similarly, multiple users may access the social networking system 100 from the same browser (e.g., a browser executing on a computer at a public library), so the cookie syncing module 155 stores multiple associations between a common browser identifier and various user identifiers.

Figure 3:
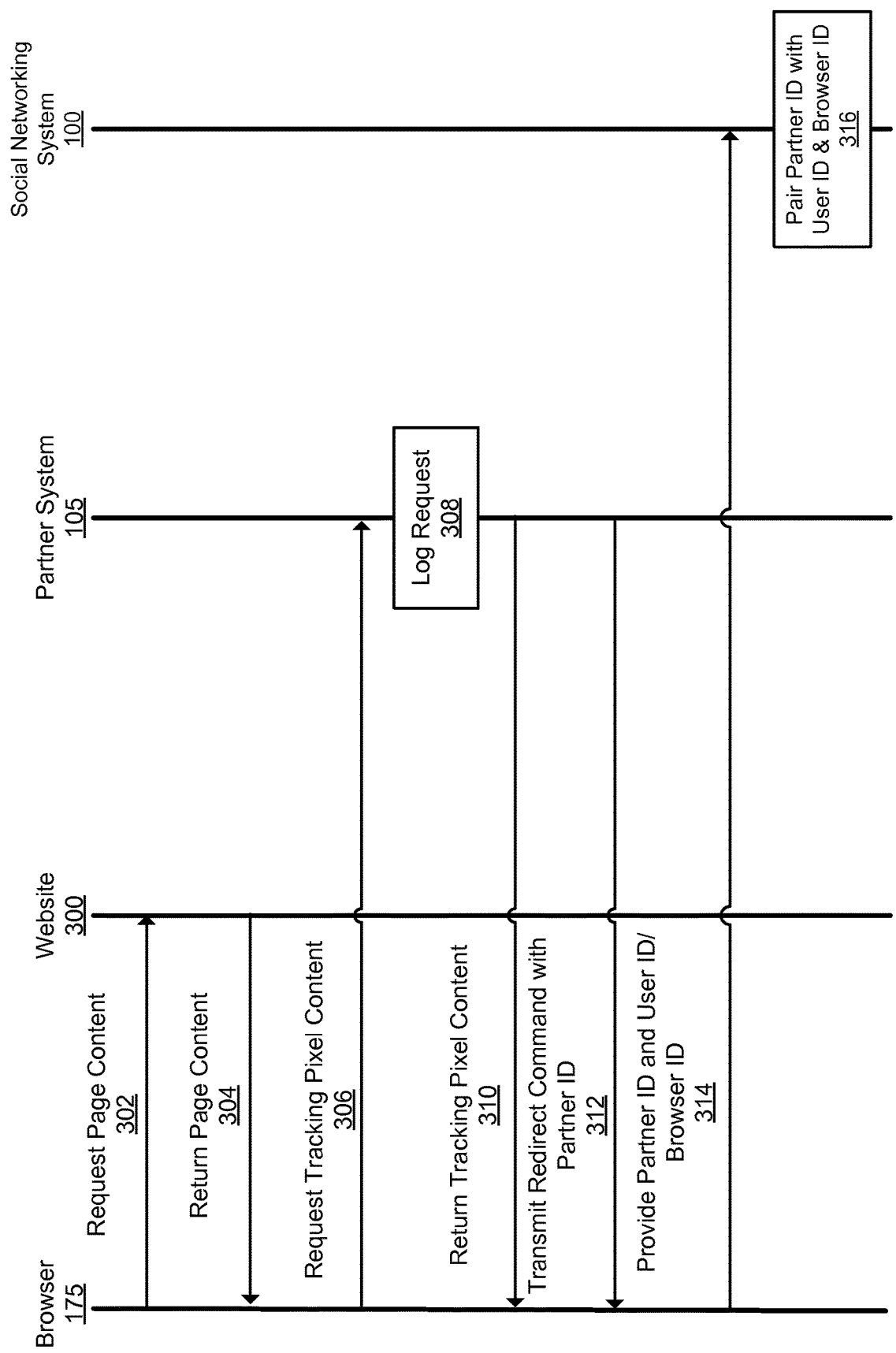
FIG. 3 is an interaction diagram illustrating a process for pairing a partner identifier with a browser identification and a user identification, according to one embodiment.

In one embodiment, the cookie syncing module 155 matches a partner identifier to an association between a user identifier and a browser identifier. A process for synchronizing a received partner identifier with an association between a user identifier and a browser identifier illustrated in FIG. 3. In FIG. 3, interactions between a browser 175, a website 300, a partner system 105, and the social networking system 100 when a user visits the website 300 are shown. In the illustrated embodiment, the website 300 comprises a page with a tracking pixel associated with the partner system 105, and the user of the browser 175 has not opted out of tracking by the partner system 105.

When the user accesses the website 300 using the browser 175, the browser 175 requests 302 content from the servers providing content for the website 300. The servers providing content for the website 300 returns 304 the requested content to the browser 175. As described above, the website content includes a tracking pixel associated with the partner system 105, so the browser 175 requests 306 the content of the tracking pixel from the partner system 105. For simplicity, FIG. 3 shows website 300 and partner system 105, but entities may provide a portion of the content requested by the browser 175 based on requests received from the browser 175.

When the browser 175 requests 306 content from the partner system 105, the partner system 105 receives access to cookies stored by the browser 175. If the browser 175 does not include stored cookies associated with the partner system 105 (e.g., the user has not previously visited a website monitored by the partner system 105 or the user has deleted the partner system's cookies), the partner system 105 stories one or more cookies to the browser 175. Additionally, the partner system 105 creates a browser identifier for the browser 175 based on the one or more cookies, and logs 308 the content request in association with the browser identifier.

If the browser 175 includes one or more cookies associated with the partner system 105 before requesting 306 the tracking pixel content (e.g., the user has previously visited a website monitored by the partner system 105), the partner system 105 accesses the one or more cookies retrieve a browser identifier associated with the browser 175 and logs 308 the content request in association with the retrieved browser identifier. The logged data describing the request may include an identification of the website 300, a time of the request, activities of the user on the web page (e.g., items purchased by the user through the website 300), as well as any other suitable information. After logging 308 the request, the partner system 105 returns 310 the content of the tracking pixel to the browser 175.

In one embodiment, the partner system 105 transmits 312 a command to the browser 175 to redirect to the social networking system 100. For example, the partner system 105 may return an HTTP redirect command when returning 310 the content of the tracking pixel; the redirect command may identify a uniform resource locator (URL) or other network identifier associated with the social networking system 100. The partner system 105 embeds the partner identifier in the URL specified by the transmitted redirect command. The browser 175 redirects to the social networking system 100, providing 314 the partner identifier embedded in the URL to the social networking system 100.

Redirecting to the social networking system 100 also provides the social networking system 100 with access to cookies stored on the browser 175. For example, if the browser 175 includes cookies specifying one or both of the browser identifier and the user identifier set by the social networking system 100, the social networking system 100 retrieves the browser identifier and the user identifier and pairs 416 the received partner identifier with the retrieved browser identifier and/or the retrieved user identifier. Associating the partner identifier with a browser identifier and/or a user identifier, the cookie syncing module 155 generates a match table 400, as illustrated in FIG. 4, which is stored for later user identification. Each row of the match table 400 identifies a pairing of user identifier and browser identifier as well as a partner identifier matched to the pairing during the process illustrated in FIG. 3.

For example, the cookie syncing module 155 may create row 402 when a user having the user identifier "Sebastian" logged in to the social networking system 100 using a browser 175 identified by the social networking system 100 as browser identifier "B_987" When the user visited a website monitored by a partner system 105, the partner system 105 may associate partner identifier "ABC" with the browser 175, as described above. The partner system 105 redirects the browser 175 to the social networking system 100 and embeds the partner identifier "ABC" in the redirect request. The cookie syncing module 155 retrieves the user identifier and browser identifier from one or more cookies stored by the browser 175 and associates the partner identifier "ABC" with the pairing of "Sebastian" and "B_987" A similar process is repeated for rows 404, 406, 408, and 410. Although FIG. 4 illustrates five rows in the match table 400, the table 400 may have thousands or millions of entries. The match table 400 may also have additional columns corresponding to different partner systems, and the various identifications are merely for the sake of example. In other embodiments, the associations may be organized in a configuration other than a table of entries.

By correlating a partner identifier with an association between user identifier and browser identifier, the cookie syncing module 155 may identify different users using the same browser or a single user using multiple browsers. Referring to FIG. 4, rows 402 and 406 of the match table 400 correspond to a browser identified using the partner identifier "ABC." However, two distinct user identifiers are associated with the partner identifier "ABC," indicating that both user "Sebastian" and user "Viola" used the browser having browser identifier "B_987." As another example, rows 406 and 408 associate the user identifier "Viola" with browser identifier "B_987" (corresponding to partner identifier "ABC") and with browser identifier "B_123" (corresponding to partner identifier "TSV"), indicating the user "Viola" accessed to the social networking system 100 using two different browsers 175.

The cookie syncing module 155 may identify users by matching cookies received at different times. For example, rows 404 and 410 of the match table 400 include entries for a browser identifier "B_654" and a partner identifier "ZYQ." To generate row 410, the cookie syncing module 155 matches the user identifier "Olivia" to the browser identifier "B_654." Row 410 may be generated because user "Olivia" accessed the social networking system using a browser 175 having the browser identifier "B_654" after row 404 was generated.

In one embodiment, the cookie syncing module 155 may periodically clean the match table 400 by combining rows corresponding to the same information. For example, after creating row 410, the cookie matching module 155 may remove of row 404, as row 410 provides the user identifier missing from row 404. In one embodiment, the cookie syncing module 155 determines whether to combine or remove rows of data from the match table 400 based on patterns observed in the data. For example, if a threshold number of user identifiers have been paired to a single browser identifier, the cookie syncing module 155 may identify the browser 175 as being on a public computer, and maintain unique match table entries for each user identifier associated with the common browser identifier.

Real-Time Bidding

When a user requests content, such as a page, of the social networking system 100, using a browser 175, the content is retrieved from one or more servers of the social networking system 100. In the time between receiving the request and sending the content to the browser 175, the auction module 135 identifies one or more advertisements for presentation to the user along with the content. The auction module 135 may determine whether to operate a standard auction or a real-time auction. In a standard auction, the auction module 135 identifies candidate ad requests from the ad store 104 based on targeting criteria in the ad requests and information associated with the user. From the set of candidate ad requests, the auction module 135 selects one or more candidate ad requests having the highest bid value(s) or expected value(s) to present advertisements described by the ad requests to the user. In one embodiment, advertisers associated with the selected ad requests pay the social networking system an amount that is the highest bid value less than the lowest bid value of a selected ad request. For example, if a page has slots for two advertisements and there are three candidate ad requests with bid values of $0.50, $0.40, and $0.30, the auction module 135 selects the ad requests having bid values of $0.50 and $0.40 and charges the corresponding advertisers $0.30. As described above, bid values may be provided in terms of CPM or in terms of cost per click (CPC).

In a real-time auction, the auction module 135 enables real-time bidding for advertisement presentation by requesting bids from partner systems 105 or advertising systems 170 to present an advertisement to a user at a particular time. For example, as servers of the social networking system 100 are retrieving content to send to a user's browser, the auction module 135 may request bids from advertiser systems 170 or partner systems 105. Based on the received bids, the auction module 135 determines one or more winning bids, retrieves the advertisements corresponding to the winning bids from the ad store 140, and sends the retrieved ads with the page content for presentation to the user.

Figure 5:
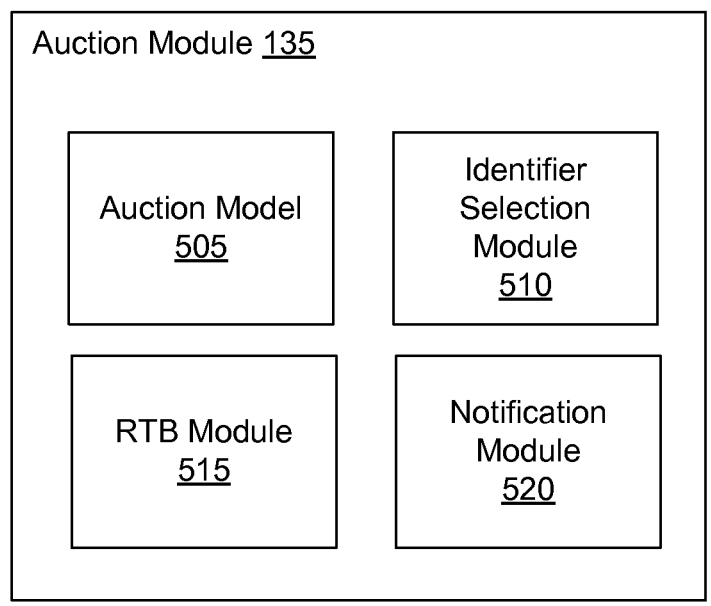
FIG. 5 is a block diagram of an auction module, according to one embodiment.

FIG. 5 is a block diagram illustrating one embodiment of a configuration of the auction module 135 to allow real-time bidding for advertisement presentation. In the configuration shown by FIG. 5, the auction module 135 includes an auction model 505, an identifier selection module 510, a real-time bidding (RTB) module 515, and a notification module 520. Other embodiments of the auction module 135 may include different or additional modules, and the functions may be distributed differently among the modules.

Auction Modeling

The auction model 505 of the auction module 135 models an auction for presenting an advertisement and determines whether to open the auction for real-time bidding. In one embodiment, an auction is opened for real-time bidding if an expected revenue of the auction is greater than a clearing price for the auction. For example, the auction model 505 determines an expected revenue of an equivalent standard auction, as defined above. The expected CPM revenue of a standard auction is the highest bid value below the lowest winning bid, and the expected CPC revenue of the standard auction is the lowest winning bid value. For example, given the three CPM bid values of $0.50, $0.40, and $0.30 for two advertisement slots of the example above, the clearing price, or expected revenue, for a standard auction is $0.30.

Figure 6A:
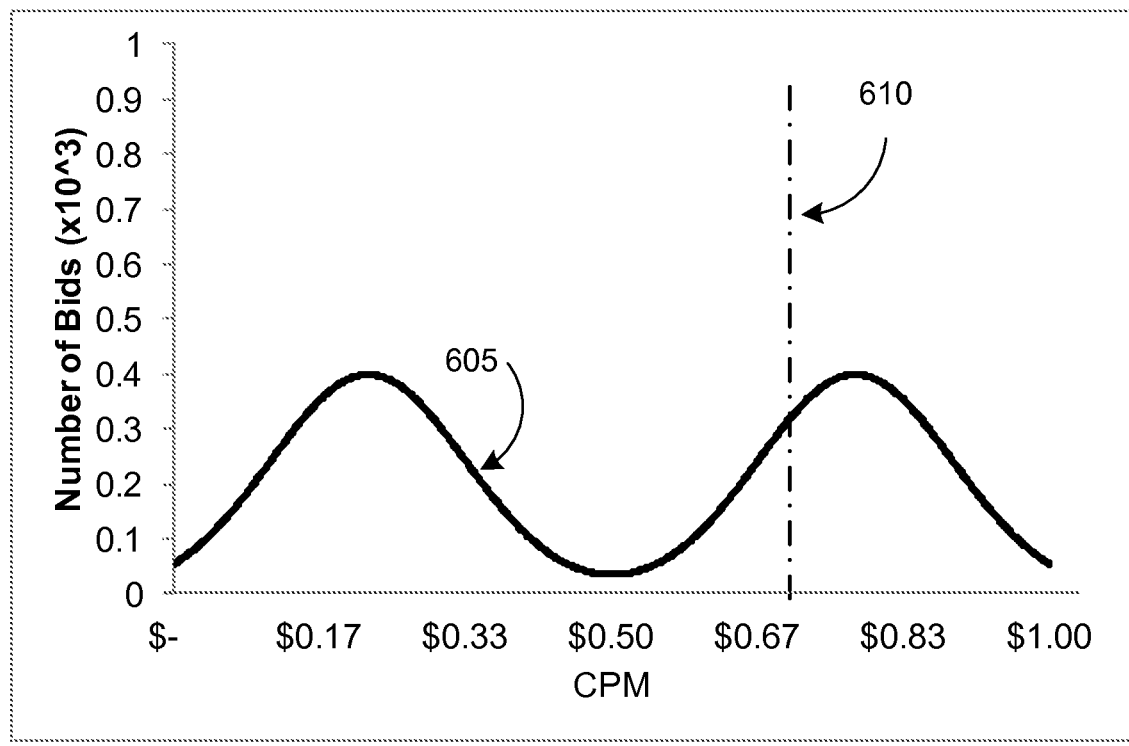
FIG. 6A is a plot illustrating an example bid prior, according to one embodiment.

The auction model 505 also determines an expected revenue for a real-time auction based on a distribution of historical bids by partner systems 105 and advertising systems 170. In one embodiment, the auction module 505 accesses bid values previously provided by various partner systems 105 for presenting advertisements to a user or to other users having similar characteristics to the user. Using the historical bid values, the auction model 505 generates a bid prior for each combination of user and partner system 105 or advertising system 170. FIG. 6A shows an example bid prior. In FIG. 6A, the curve 605 illustrates the number of bids that a particular advertiser system 170 or partner system 105 has placed at various bid values. For example, the illustrated bid prior identifies approximately four hundred bids placed with a bid value of $0.22. FIG. 6A also illustrates a clearing price 610, indicating the expected CPM of a standard auction conducted for the same user.

Each partner system 105 may maintain multiple personas for a user corresponding to different partner identifiers. For example, in the match table 400 of FIG. 4, the user identifier "Viola" is associated with two partner identifiers "ABC" and "TSV." The auction model 505 may construct distinct bid priors for each persona.

In one embodiment, rather than constructing bid priors based on historical bids by partner systems 105 and/or advertising systems 170 for the user, the auction model 505 may retrieve historical bid values received from partner systems 105 or advertising systems 170 for other users with similar characteristics to the user. For example, if the user is a male in the age range of 14-18, the auction model 505 may construct bid priors based on historical bid values for bids by partner systems 105 for other 14- to 18-year-old males.

The auction model 505 uses the bid priors to determine a probability distribution of bids from partner systems 105 or from advertising systems 170 for the user. If the bid priors are relatively simple, such as the bid prior represented by the curve 605, the auction model 505 may model the prior as a sum of Gaussian distributions and integrate the model distribution to determine a probability of a bid being placed at a given value. For example, to determine the probability that the partner will place a bid that is greater than the clearing price 610, the auction model 505 calculates the expected value of the distribution above the clearing price 610. If the expected value is above a threshold, the auction model 505 determines the social networking system 100 will earn more revenue from a real-time auction than from a standard auction. For example, the auction model 505 may set a threshold of $0.10. If the expected value of the distribution is less than ten cents greater than the clearing price, the auction model 505 determines the difference in price does not offset the bandwidth used for a real-time auction and performs a standard auction.

Figure 6B:
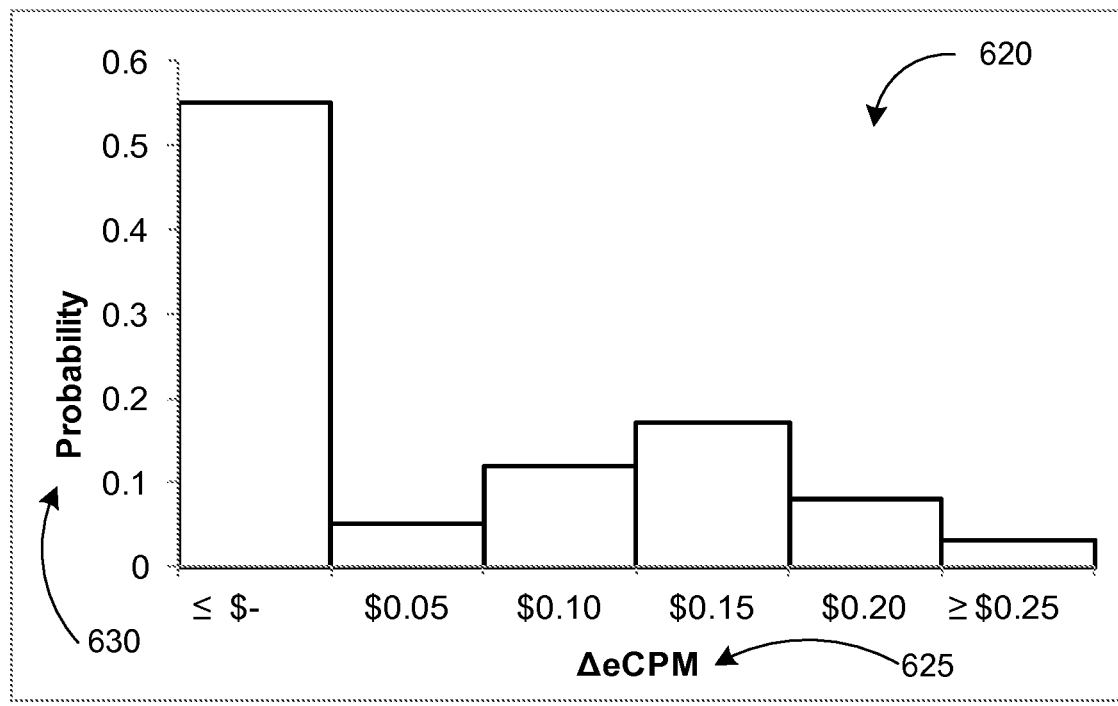
FIG. 6B is a histogram illustrating an example revenue distribution, according to one embodiment.

Alternatively, if the bid priors cannot be readily modeled as a Gaussian distribution, the auction model 505 may use a Monte Carlo simulation to determine the probability distribution. For example, for each iteration of the Monte Carlo simulation, the auction model 505 may randomly sample a bid prior of each partner system 105 or advertising system 170 and simulate an auction using the random samples. The sampling is iterated a number of times and, based on the samples, the auction model 505 constructs a histogram indicating the probability of various levels of revenue. An example histogram 620 is illustrated in FIG. 6B. The bins of the x-axis represent the expected increase in CPM for a real-time auction, ΔeCPM, 625 relative to the clearing price of the standard auction. Hence, the ΔeCPM 625 represents the expected revenue of the real-time auction. The y-axis of the histogram, probability 630, indicates the probability of a real-time auction having a given ΔeCPM 625, as determined by a Monte Carlo simulation or by integrating one or more Gaussian distributions fit to the bid priors of a number of partners, associated with a given user.

The auction model 505 integrates the probability histogram 620 to determine the average ΔeCPM for a real-time auction. In one embodiment, the auction model 505 compares the average ΔeCPM to a predefined threshold, such as $0.10. If the average ΔeCPM is below the threshold, the auction model 505 determines that a real-time auction is unlikely to generate more revenue than a standard auction. If the average ΔeCPM is above the threshold, the auction model 505 initiates real-time bidding for the available advertising impressions.

Figure 7:
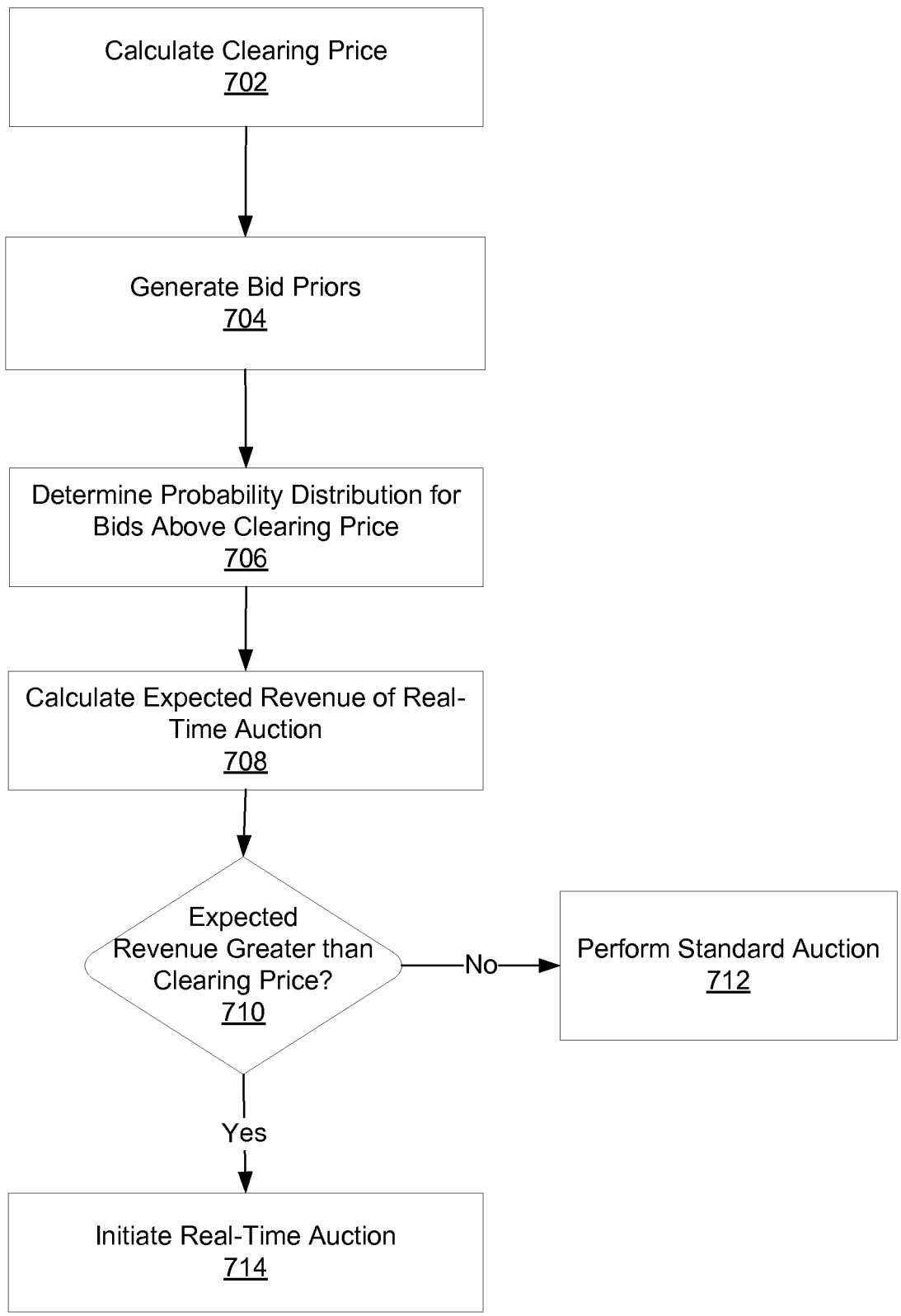
FIG. 7 is a flowchart of a method for using probability distributions to determine whether to open an auction for real-time bidding, according to one embodiment.

FIG. 7 is a flowchart illustrating one embodiment of a method for determining whether to open an auction for real-time bidding. In one embodiment, the steps of the method are performed by the auction model 505. Embodiments other than the one shown by FIG. 7 may include different and/or additional steps, and may perform the steps in different orders.

The auction model 505 calculates 702 a clearing price for an auction based on an equivalent standard auction. The clearing price represents a minimum expected revenue for the operator of the social networking system 100 for presenting an advertisement to a user.

The auction model 505 generates 704 a plurality of bid priors for a user, each bid prior identifying a distribution of historical bids placed by advertising systems 170 or partner systems 105 for presenting advertisements to the user. Alternatively, the generated bid priors are based on previously placed bids for presenting advertisements to other users having characteristics similar to the user. Based on the generated bid priors, the auction model 505 determines 706 a probability distribution of bids placed above the clearing price of the equivalent standard auction. For example, the auction model 505 uses a Monte Carlo method to randomly sample the bid priors above the clearing price of the standard auction to simulate a real-time auction and identify the winning bid value of a number of simulated auctions. Based on the winning bid values of the simulations, the auction model 505 constructs a probability distribution.

Based on the probability distribution, the auction model 505 calculates 708 an expected revenue and determines 710 whether the expected revenue is above the clearing price of the standard auction. If the expected revenue is not above the clearing price of the standard auction, the auction model 505 performs 712 a standard auction. If the expected revenue is above the clearing price, the auction model 505 initiates 714 real-time bidding to select the advertisement for presentation.

Identifier Selection

The identifier selection module 510 determines which partner identifier to send to partner systems 105 when requesting real-time bids from the partner systems 105. As described above, each user identifier may be associated with multiple browser identifiers, which are each associated with a partner identifier. When a user accesses content from the social networking system 100, the identifier selection module 510 receives the user identifier of the user accessing the content and accesses the match table generated by the cookie syncing module 155 to identify the partner identifiers associated with the received user identifier. The match table may include partner identifiers associated with multiple partner systems 105, and multiple partner identifiers associated with a single partner system 105 may be associated with a single user.

In one embodiment, the identifier selection module 510 determines a set of partner systems 105 from which real-time bids are requested. The determination may be based on the bid priors for the target user associated with each partner system 105. For example, the identifier selection module 510 selects partner systems 105 for which there is at least a threshold probability that the revenue from the real-time auction will be greater than a clearing price of a standard auction. In another embodiment, the identifier selection module 510 selects all partner systems 105 associated with the social networking system 100 to increase competition.

If a partner system 105 associates different partner identifiers with a user (e.g., the user accessed content from multiple browsers), the identifier selection module 510 determines which partner identifier associated with the user's user identifier in the match table to send to each partner system 105. In one embodiment, the identifier selection module 510 sends the partner system 105 the partner identifier associated with the browser identifier that the user is currently using. For example, referring to the match table 400 of FIG. 4, if user "Viola" is currently using the browser associated with browser identifier "B_123" (corresponding to the partner identifier "TSV"), the identifier selection module 510 sends a partner system 105 the partner identifier "TSV," rather than the partner identifier "ABC," which is also associated with "Viola," because the partner identifier "ABC" is associated with a browser identifier of a browser that is not currently used. In another embodiment, the identifier selection module 510 selects the partner identifier based on the bid priors associated with the partner identifiers. For example, if user "Viola" is known to a partner system 105 using both partner identifier "ABC" and partner identifier "TSV," and the bid prior associated with the partner identifier "TSV" has a higher probability of the partner system 105 providing a bid above the clearing price of the standard auction, the identifier selection module 510 selects the partner identifier "TSV," regardless of the browser currently being used by "Viola."

Figure 8:
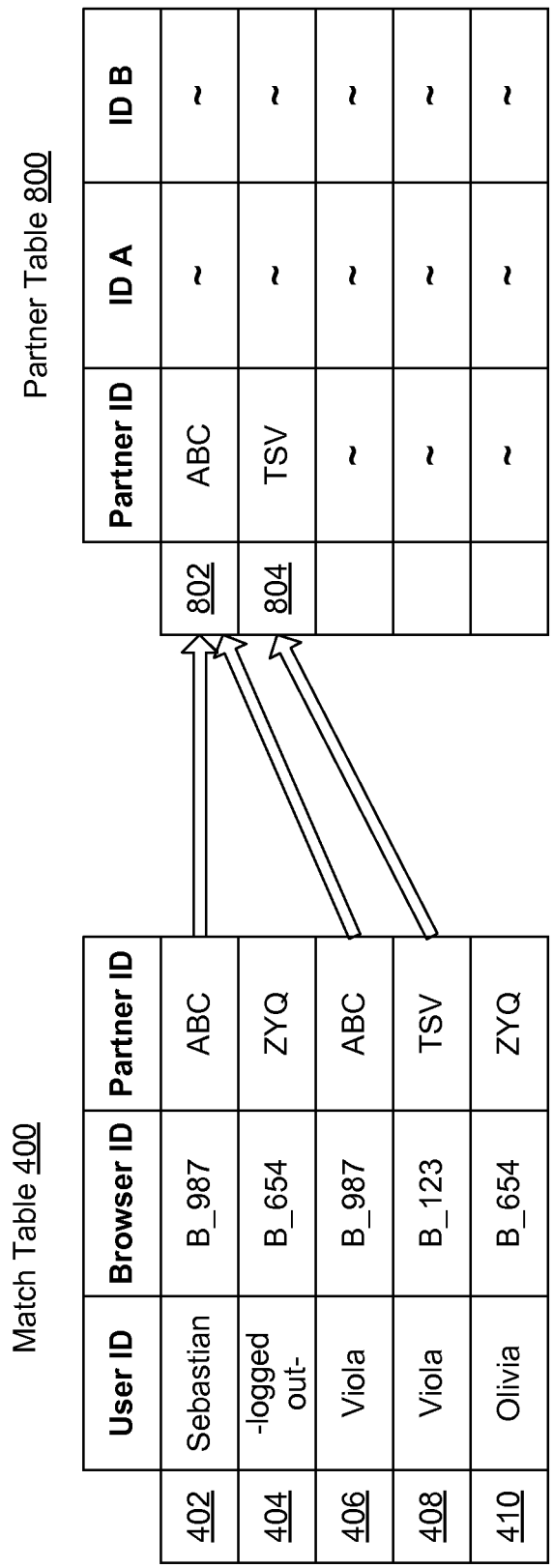
FIG. 8 illustrates an example matching between a match table and a partner table, according to one embodiment.

FIG. 8 illustrates an example of user identification based on synced cookies. As illustrated in FIG. 8, a partner system 105 may generate a partner table 800 associating partner identifier with other information relevant to the partner system 105 (e.g., stored in columns "ID_A," "ID_B," or other columns of the table 800 that are not illustrated). For example, when a user identified by the partner identifier "ABC" visits a website monitored by the partner system 105, the partner system 105 may retrieve the partner identifier from the browser 175 used to access the website and log the website, the time of the visit, and the activity on the website. The information logged by the partner system 105 is indexed based on partner identifier 105.

As illustrated in the example of FIG. 8, the partner table 800 comprises a single listing 802 for information related to the partner identifier "ABC," while the social networking system's match table 500 has two entries 502 and 506 associating the partner identifier "ABC" with different user identifiers. For example, the user "Viola" in the match table 400 is associated with two different browser identifiers and two different partner identifiers "ABC" and "TSV," while the partner table 800 includes separate entries 802, 804 for partner identifiers "ABC" and "TSV." For example, if "Viola" is a user to be presented with an advertisement, the identifier selection module 510 determines which partner identifier paired to the user identifier "Viola" to send the partner system 105 to request bids. For example, if the social networking system 100 determines the browser identifier "B_987" associated with the partner identifier "ABC" is a browser 175 on a public computer, the identifier selection module 510 selects partner identifier "TSV" for sending to the partner system 105.

Because the social networking system 100 maintains the match table 400 identifying associations between partner identifiers and user identifiers, the social networking system 100 may request bids from various partner systems 105 or advertising systems 170 for presenting advertisements to a user at a particular time. When the social networking system 100 requests a bid from a partner system 105 for advertising to a user, the social networking system 100 includes in the request the partner identifier associated with the user's user identifier. The partner system 105 retrieves information associated with the partner identifier (e.g., retrieves data from the partner table 800 associated with the partner identifier included in the request), such as browsing history corresponding the partner identifier, and selects an advertisement as well as a bid value for the advertisement. The bid value may be determined based on targeting criteria associated with the selected advertisement and the degree to which the browsing history associated with the partner identifier matches the targeting criteria.

Real-Time Auctions

The real-time bidding (RTB) module 515 manages real-time auctions. In one embodiment, the RTB module 515 sends a request including a partner identifier selected by the identifier selection module 510 to partner systems 105 to request bids from the partner systems 105. Based on information in the request, a partner system 105 selects an advertisement and determines a bid value for the selected advertisement ad based on information associated with the partner identifier by the a partner system 105r. The RTB module 515 receives bids specifying a bid value and an ad identifier corresponding to an advertisement in the ad store 140 selected by a partner system 105. Based on the bids, the RTB module 515 selects an ad identifier that is communicated to the ad server 125, which sends the ad corresponding to the selected ad identifier to the user.

The notification module 520 notifies partner systems 105 of winning auction bids. In one embodiment, the notification identifies ad that was presented and the amount the partner system 105 owes the social networking system 100. In one embodiment, the notification module 520 uses server-to-server notification to protect the user's information. For example, the notification module 520 notifies a partner system 105 of a winning auction bid by a uniform resource locator (URL) having the form:

partner.com?ad_ID&bid_value, where "ad_ID" is the advertisement identifier of the selected ad, "bid_value" is the amount owed by the partner system 105, and "partner.com" is an address associated with the partner system 105.

Limiting the information provided to the partner system 105 to information relevant to the winning bid, the notification module 520 prevents the partner system 105 from obtaining information from a user's browser. For example, if the identifier selection module 510 selects a partner identifier associated with a different browser than that currently used by the user, and if the partner system 105 is permitted access to the user's browser, the partner system 105 may infer that the user is associated with multiple partner identifiers. By limiting the content of the notification to information about a bid, the notification module 520 protects the privacy of social networking system users.

In one embodiment, the social networking system 100 allows a trusted analytics partner to access a view-through pixel on a page displaying advertisements. The analytics partner may measure the performance of advertisements by monitoring the ads displayed to certain users and the subsequent activity (e.g., items purchased) of those users. This allows the trusted analytics partner to inform advertisers of the efficacy of their ads.

Figure 9:
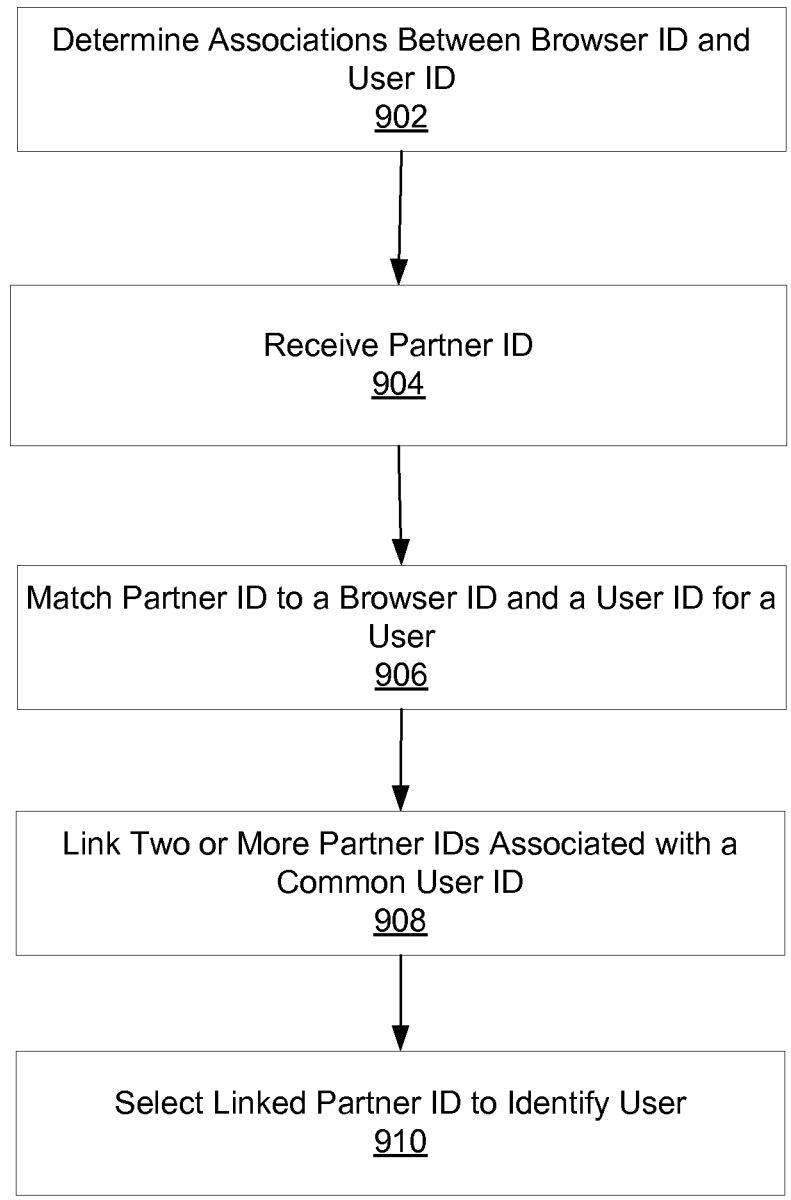
FIG. 9 is a flowchart of a method for requesting advertisement bids in real time, according to one embodiment.

FIG. 9 is a flowchart illustrating one embodiment of a method for using cookie syncing to enable real-time bidding. As described above, the social networking system 100 determines 902 associations between user identifiers and browser identifiers based on cookies stored by browsers 175 used to access the social networking system 100. For example, when a user accesses a third-party site monitored by a partner system 105, the partner system 105 redirects the browser 175 used to the social networking system 100. The social networking system 100 receives 904 the partner identifier of the browser 175 from the redirection and accesses the browser to identify a user identifier and/or browser identifier from cookies stored by the browser 175. Using the user identifier and/or browser identifier identified from the browser 175, the social networking system 100 accesses a match table to match 906 the received partner identifier with an existing pairing of user identifier and browser identifier.

If a user has used multiple browsers 175 to access the social networking system 100, the social networking system 100 links 908 two or more partner identifiers associated with a common user identifier. For example, a user may access the social networking system 100 from multiple devices or from multiple browsers 175 executing on a single device, so the social networking system associated the user's user identifier with multiple browser identifiers. Hence, partner identifiers associated with the various browsers may be linked to the user identifier of the user.

One of the partner identifiers linked to a user identifier is selected 910 to identify a user to partner systems 105 for bidding on an advertisement. In one embodiment, the social networking system 100 selects 910 a partner identifier associated with a different browser than the browser currently used by the user. By linking multiple partner identifiers with a single user identifier and selecting 910 a partner identifier to request ads for the user, the social networking system 100 allows ads to be targeted to a particular user rather than to a particular browser 175. Although the partner systems 105 index information based on partner identifier, which corresponds to a browser 175, linking partner identifiers to a user identifier allows user activity using multiple browsers 175 to influence ads presented through a particular browser. Additionally, the social networking system 100 protects user identity by providing a partner identifier to a partner system 105 without providing information about linkages between user identifiers and partner identifiers.

SUMMARY

While various embodiments and modules for implementing those embodiments have been described above, these descriptions are intended to be illustrative but not limiting of the scope of the present invention. Those of skill in the art will appreciate that the invention may be practiced in other embodiments. The particular naming of the components, capitalization of terms, the attributes, data structures, or any other programming or structural aspect is not mandatory nor significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may be instead performed by a single component.

The present invention also relates to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, such as, but not limited to, any type of disk including floppy disks, optical disks, CD-ROMs, magnetic-optical disks, read-only memories (ROM), random-access memories (RAM), EPROMs, EEPROMs, magnetic or optical cards, application specific integrated circuits (ASICs), or any type of media suitable for storing electronic instructions, and each coupled to a computer system bus. Furthermore, any computing systems referred to in the specification may include a single processor or may be architectures employing multiple processor designs for increased computing capability.

The present invention is well suited to a wide variety of computer network systems over numerous topologies. Within this field, the configuration and management of large networks comprise storage devices and computers that are communicatively coupled to dissimilar computers and storage devices over a network, such as the Internet. In addition, the present invention is not limited to any particular programming language. It is appreciated that a variety of programming languages may be used to implement the teachings of the present invention as described herein.

Finally, it should be understood that the language used in this specification has been selected for readability and instructional purposes, and may not have been selected to delineate or circumscribe the inventive subject matter. The scope of the invention is set forth in the following claims.

What is claimed is:

1. A method comprising:
   generating a match table that stores one or more associations between each browser identifier of a client device to one or more partner identifiers, the associations generated by:
   receiving redirected browser requests from browsers of client devices that include a uniform resource locator (URL) with an embedded partner identifier of a partner systems, the redirected browser requests initiated by the partner system;
   accessing browser identifiers from the browsers of the client devices; and
   accessing one or more partner identifiers from the redirected browser requests to associate with the browser identifiers;
   accessing historical bid information received at an online system from a plurality of advertisers, the historical bid information received from an advertiser describing bids previously received from the advertiser for presenting advertisements to one or more users of the online system and bid values of the bids previously received from the advertiser;
   generating, using the accessed historical bid information, a probability distribution of bid values from the plurality of advertisers, the probability distribution indicating probabilities of receiving bids from the advertisers at different bid values;
   determining, based on the probability distribution of bid values, an expected revenue for the online system from real-time receipt of bids for presenting an advertisement to a user of the online system to fill an opportunity to advertise to the user;
   comparing by the online system, the expected revenue to a threshold value;
   responsive to the expected revenue not exceeding the threshold value, selecting the advertisement based on the bid values included in the stored ad requests;
   responsive to the comparison indicating the expected revenue exceeds the threshold value, requesting real-time bids from one or more of the advertisers for advertisements to fill the opportunity to advertise to the user of the online system by:
   accessing a browser identifier of a web browser of the user of the online system, the browser identifier stored in a cookie of the web browser on a client device of the user of the online system, the cookie accessed using computer-readable instructions provided to the web browser by the online system;
   accessing the match table stored at the online system to search and identify one or more partner identifiers associated with the browser identifier, a partner identifier identifying the user to an advertiser; and
   transmitting the one or more partner identifiers to the one or more advertisers to request the real-time bids;
   receiving one or more real-time bids from the one or more advertisers for presenting an advertisement to the user to fill the opportunity;

19 selecting the advertisement to fill the opportunity based on the received bids from the one or more of the advertisers; and transmitting, from the online system to a client device of the user via a network, the advertisement for presentation at a display of the client device.

2. The method of claim 1, wherein the threshold value is a clearing price of an auction performed based on previously received bid values.

3. The method of claim 1, wherein determining the probability distribution of bid values from the plurality of advertisers based on the accessed historical bid information comprises:
simulating a plurality of auctions based on data selected from the historical bid information; and
determining the probability distribution based on the simulations.

4. The method of claim 1, wherein the probability distribution indicates a probability of the expected revenue being greater than the threshold value.

5. The method of claim 1, wherein the historical bid information received from the advertiser comprises information describing bid values previously received from the advertiser for presenting advertisements to the user.

6. A method comprising:
generating a match table that stores one or more associations between each browser identifier of a client device to one or more partner identifiers, the associations generated by:
receiving redirected browser requests from browsers of client devices that include a uniform resource locator (URL) with an embedded partner identifier of a partner systems, the redirected browser requests initiated by the partner system;
accessing browser identifiers from the browsers of the client devices; and
accessing one or more partner identifiers from the redirected browser requests to associate with the browser identifiers;
receiving at an online system, a plurality of ad requests from a plurality of advertisers, each ad request including a bid value representing revenue to the online system for presenting an advertisement associated with the ad request;
determining an opportunity to present an advertisement to a user of the online system;
determining a clearing price based on the bid values included in the plurality of ad requests, the clearing price indicating a minimum revenue of the online system for the opportunity to present an advertisement to the user;
accessing historical bid information received from the plurality of advertisers, the historical bid information received from an advertiser describing bid values of bids previously received from the advertiser for presenting advertisements to one or more users of the online system;
generating a probability distribution of bid values from the plurality of advertisers from the accessed historical bid information, the probability distribution indicating probabilities of receiving bids from the advertisers at different bid values;
determining, based on the probability distribution of bid values, an expected revenue for the online system from additional bids received from advertisers for presenting an advertisement to the user to fill the opportunity;
comparing the expected revenue to the clearing price;

20 determining whether the expected revenue is greater than a threshold amount above the clearing price;

responsive to the expected revenue not exceeding the threshold value, selecting the advertisement based on the bid values included in the stored ad requests;

responsive to the expected revenue being greater than the threshold amount above the clearing price, requesting real-time bids from one or more of the advertisers for presenting an advertisement to the user to fill the opportunity by:
accessing a browser identifier of a web browser of the user of the online system, the browser identifier stored in a cookie of the web browser on a client device of the user of the online system, the cookie accessed using computer-readable instructions provided to the web browser by the online system;
accessing the match table stored at the online system to search and identify one or more partner identifiers associated with the browser identifier, a partner identifier identifying the user to an advertiser; and
transmitting the one or more partner identifiers to the one or more advertisers to request the real-time bids;
receiving one or more real-time bids from one or more of the advertisers for presenting an advertisement to the user;
selecting one or more of the advertisements associated with one of the real-time bids received from the one or more advertisers to present to the user to fill the opportunity; and
transmitting, from the online system to a client device of the user via a network, the advertisement for presentation at a display of the client device.

7. The method of claim 6, wherein determining the probability distribution of bid values from the plurality of advertisers from the accessed historical bid information comprises:
simulating a plurality of auctions based on data selected from the historical bid information; and
determining the probability distribution based on the simulations.

8. The method of claim 6, wherein the probability distribution indicates a probability of the expected revenue being greater than the threshold value.

9. The method of claim 6, wherein the historical bid information received from the advertiser comprises information describing bid values previously received from the advertiser for presenting advertisement to the user.

10. The method of claim 6, wherein the historical bid information received from the advertiser comprises information describing bid values previously received from the advertiser for presenting advertisement to one or more users sharing one or more characteristics with the user.

11. The method of claim 6, further comprising:
presenting the selected advertisement for display to the user.

12. The method of claim 1, wherein the probability distribution is generated by:
for each iteration of a Monte Carlo computer simulation:
randomly sampling one or more prior bids of an advertiser;
simulating an auction using the one or more prior bids to determine an expected increase in revenue of a winning bid of the simulated auction relative to a clearing price of a standard auction using the one or more prior bids;
generating a histogram using the simulated auctions, each bin of the histogram indicating one of a plurality of expected increases in revenue relative to a clearing price of a standard auction, and the value of each bin indicating a probability of a real-time auction given the one of the plurality of expected increases in revenue; and wherein the expected revenue is generated according to an average of the plurality of expected increases in revenue.

* * * * *